UNITED STATES PATENT OFFICE.

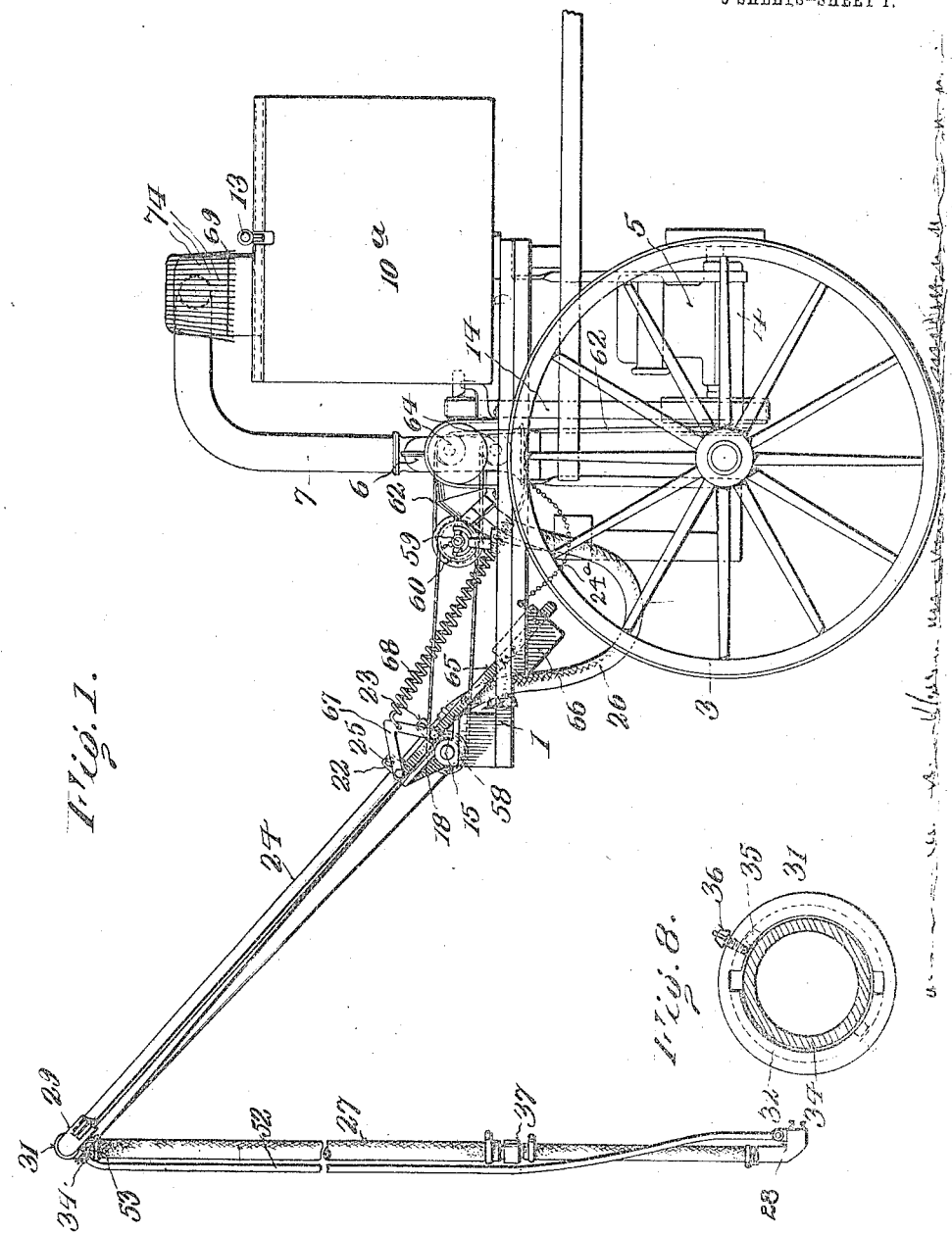

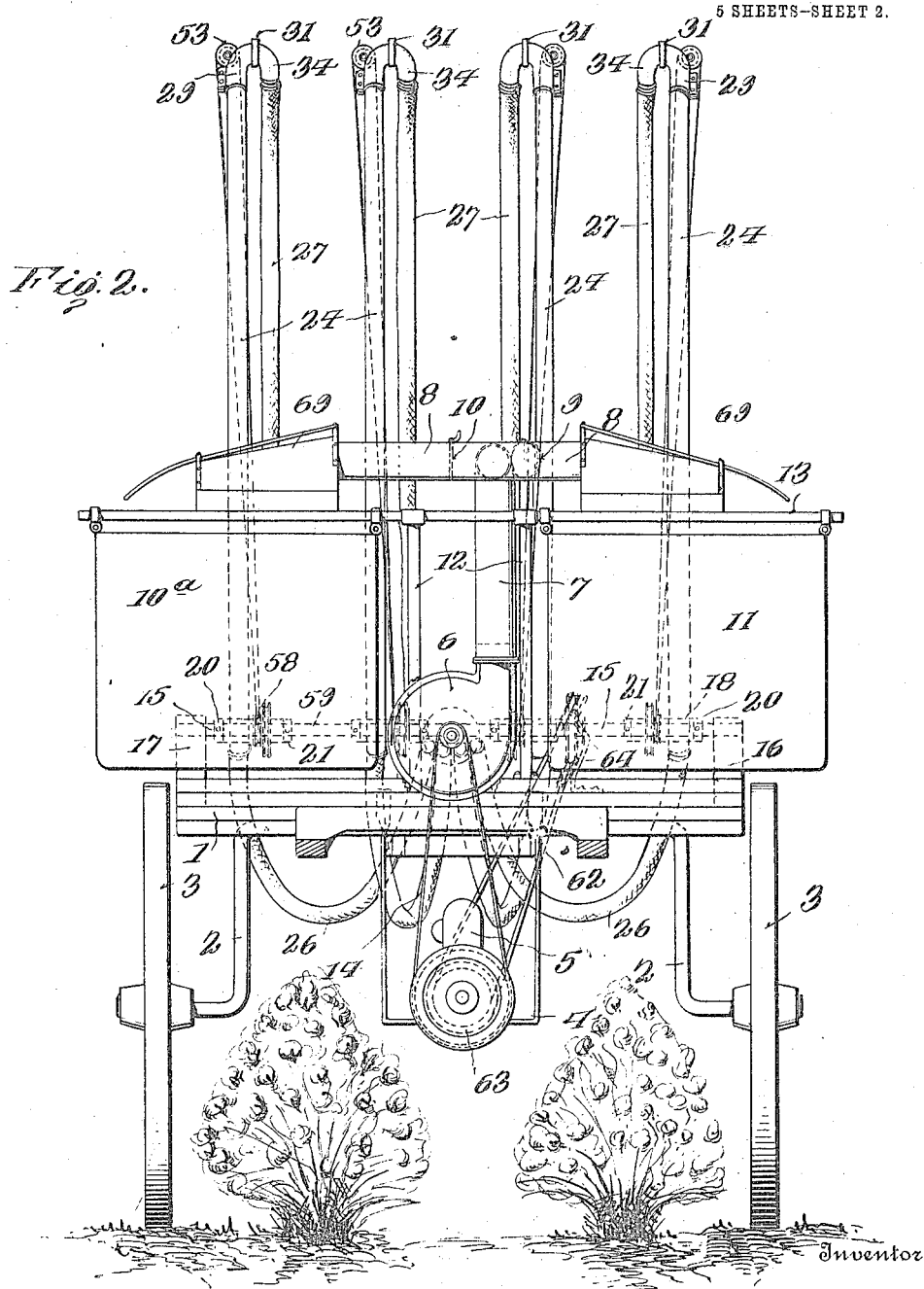

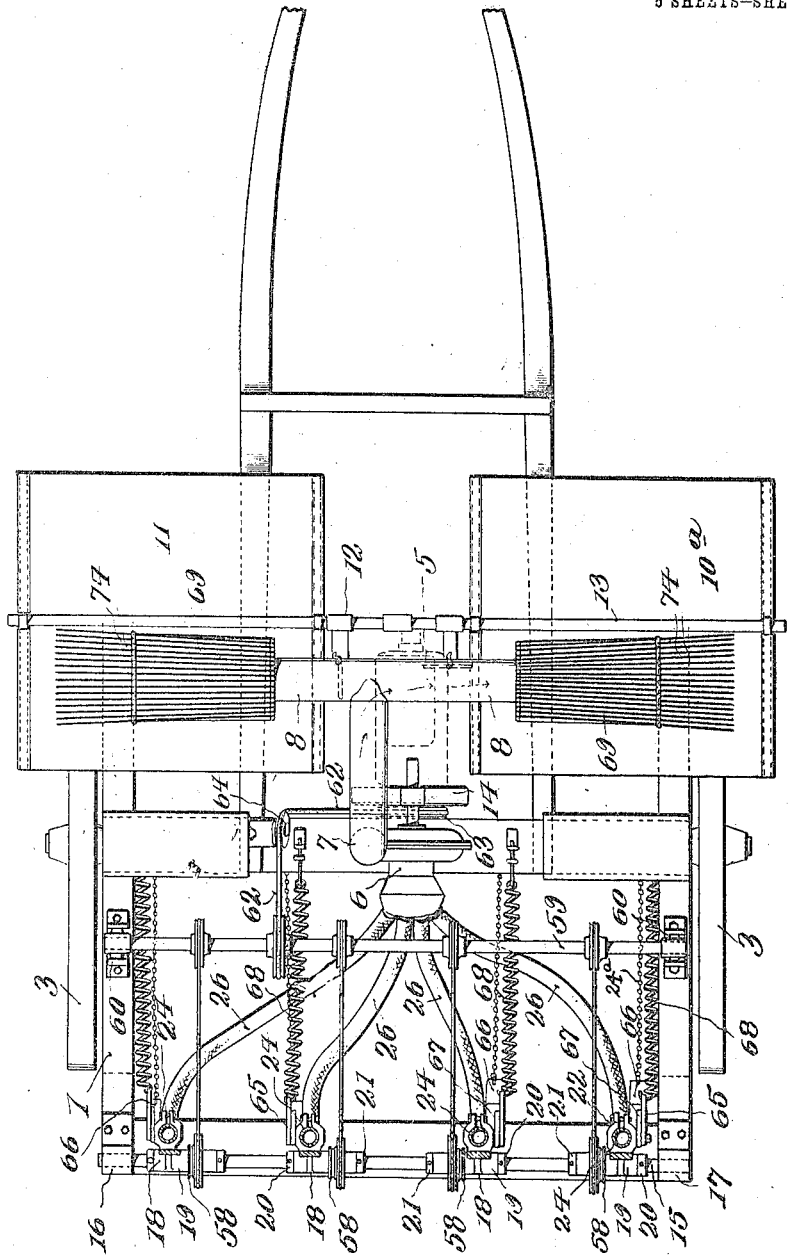

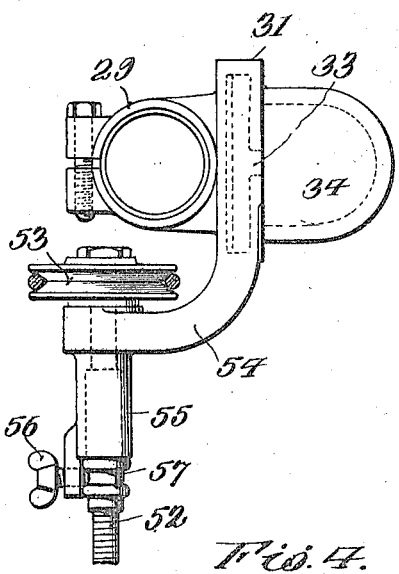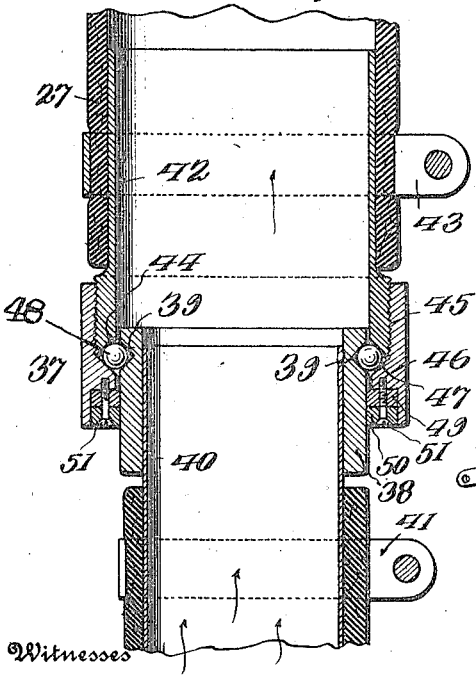

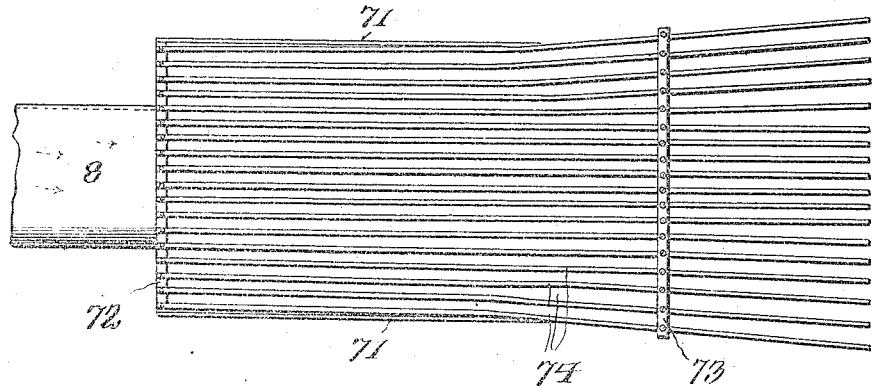
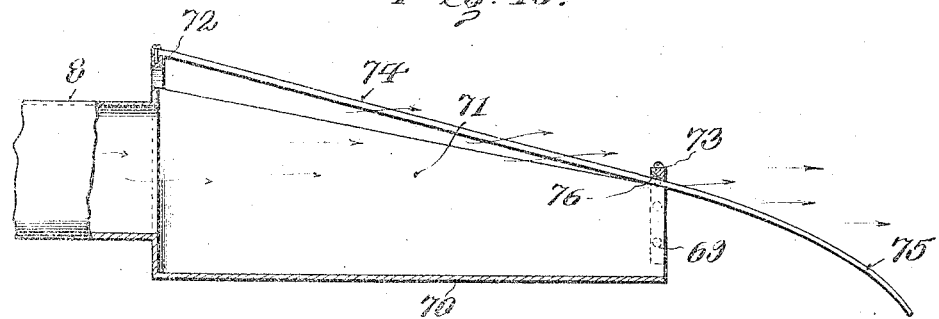
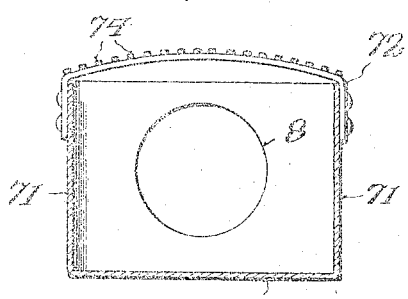
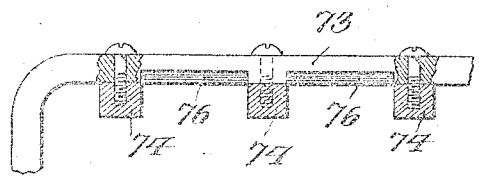

THEODORE E. STRAUS, OF BALTIMORE, MARYLAND, ASSIGNOR TO WORTHINGTON COTTON HARVESTER COMPANY, OF BALTIMORE, MARYLAND, A CORPORATION OF DELAWARE.

COTTON-PICKER.

1,123,620.  Specification of Letters Patent.  Patented Jan. 5, 1915.

Application filed October 2, 1912. Serial No. 723,518.

*To all whom it may concern:*

Be it known that I, THEODORE E. STRAUS, a citizen of the United States, residing at 10 South street, Baltimore, State of Maryland, have invented certain new and useful Improvements in Cotton-Pickers, of which the following is a description, reference being had to the accompanying drawing and to the figures of reference marked thereon.

The invention relates to new and useful improvements in cotton pickers, wherein the cotton is removed from the boll by a picking nozzle having mechanically actuated picking fingers, and wherein the cotton is conveyed from the nozzle to the storage receptacle by suction.

An object of the invention is to provide a cotton picker which is of few parts and light in weight so that it may be readily moved about the cotton field, and wherein a plurality of picking nozzles may be simultaneously used for picking the cotton.

A further object of the invention is to provide a cotton picker of the above character with devices for counter-balancing or carrying the weight of the flexible conveying pipe and the operating shaft for the mechanical pickers, whereby the weight of these parts is removed from the picker, so that the nozzle may be readily raised and lowered and shifted to all parts of the cotton plant without any special exertion on the part of the picker.

A further object of the invention is to provide a cotton picker of the above character with a separate conveyer pipe for each nozzle, which conveyer pipe is formed of suitable rigid sections having the proper joints to allow a free movement vertically, and wherein the flexible pipe is also provided with suitable joints, whereby the picking nozzle may be turned easily about its longitudinal axis, and whereby said nozzle may be readily shifted from one part of the plant to another.

A still further object of the invention is to provide a cotton picker of the above character with suitable means for distributing the cotton in the hamper or storage receptacle, as it leaves the conveyer pipe.

These and other objects will in part be obvious and will in part be hereinafter more fully disclosed.

In the drawings, which show by way of illustration, one embodiment of the invention, Figure 1 is a side view of a cotton picker embodying my improvements; Fig. 2 is a front view of the same; Fig. 3 is a plan view of the same, the rigid conveyer pipe being swung to substantially vertical position and sectioned; Fig. 4 is an enlarged detail in longitudinal section, showing the connection between the parts of the flexible hose or pipe; Fig. 5 is an enlarged detail showing the coupling for connecting the flexible hose to the movable rigid conveyer pipe, and the bracket for supporting the driving shaft for the mechanical picking fingers; Fig. 6 is a longitudinal sectional view through the flexible pipe and the inflexible pipe, and showing the connection between the two; Fig. 7 is a perspective view of the supporting bracket for the rigid conveyer pipe, also showing in separated view some of the parts supported by the bracket; Fig. 8 is a face view showing the manner of joining the parts of the coupling between the flexible hose or pipe and the rigid pipe; Fig. 9 is a plan view of the distributer for distributing the cotton in the storage receptacle; Fig. 10 is a longitudinal sectional view of the same; Fig. 11 is an end view of the distributer from the receiving end thereof; and Fig. 12 is a detail showing the distributing bars in section.

My improved cotton picker consists generally of a supporting vehicle on which is mounted a suction device and a motor or engine for driving the same. This suction device delivers into the storage receptacles, and suitable means is provided for distributing the cotton in the receptacles after it leaves the suction passage, which means is also so constructed as to separate sand and other small heavy particles from the cotton. A number of conveyer pipes which are formed of light metal are pivotally supported by the supporting vehicle and are counter-balanced by suitable weights. A spring is attached to each one of these pipes so that they are normally held in raised position. Each pipe is connected by a separate flexible hose to the suction device. Each pipe also supports at its outer end a flexible hose which is connected to the picking nozzle. The mechanical picking devices of the nozzle are driven by a flexible shaft, which is also supported to the outer end of the metal conveyer pipe, and driven by suitable connections from a counter-shaft operated by the motor.

Referring more in detail to the drawings, the improved cotton picker consists of a supporting vehicle which is formed with a main supporting frame 1, carrying downwardly projecting and laterally turned brackets 2, 2, on which are mounted the supporting wheels 3, 3. Suspended from the supporting frame 1 is a carrying frame 4, on which is mounted a motor 5, which may be of any desired character, but preferably of the gas engine type. The main supporting frame 1 is preferably raised sufficiently from the ground so that it will pass readily over the cotton plants. The wheels are also spaced so as to pass between the rows of the cotton plant, while the suspended frame 4 carrying the motor is located centrally of the main frame, and will pass between two rows of cotton plants. The vehicle is drawn in the usual way.

Supported on the main frame 1 is a suction device 6, which is preferably of the rotating fan type. This suction device is connected to a receiving pipe 7, into which the cotton is delivered by the suction device. The receiving pipe 7 extends upwardly from the frame, and is bent backwardly, so as to over-hang the same. Said receiving pipe is provided with a cross pipe 8, which leads to each side of the receiving pipe, and extends preferably transversely of the vehicle. The cotton is delivered from the receiving pipe into the branch cross pipe at either side thereof, said cross pipe being formed with suitable valves 9 and 10 respectively, which control the delivery of the cotton. The cotton passes from the cross pipe into a suitable storage receptacle 10ª, and from the cross pipe 9 into a suitable storage receptacle 11. As herein shown, the main frame is formed with supporting standards 12, on which is mounted a cross bar 13. The storage receptacle 10ª is in the form of a hamper, which is swung from this cross bar 13. Likewise, the storage receptacle 11 is in the form of a hamper and swung from the same cross bar 13. The manner of distributing the cotton in the hampers will be referred to more in detail hereinafter.

The suction device 6 is driven from the motor 5 by a belt 14, which engages a belt wheel on the main shaft of the motor, and also a belt wheel on the main shaft of the rotating suction device.

Mounted on the main frame 1 is a fixed cross shaft or support 15. This cross shaft or support is carried by brackets 16 and 17 at its outer ends, which brackets are attached to the main frame 1 of the supporting vehicle. Mounted to swing freely upon said fixed cross shaft are a plurality of brackets 18, each of which is similar in construction, and each of which support a conveyer pipe, and the operating mechanism for a picking nozzle. The description of one of said brackets and the parts carried thereby will answer for the others. The bracket 18 is shown in detail in Fig. 7, and consists of a sleeve 19, which turns freely on the fixed shaft or support 15 between spaced collars 20 and 21. This bracket has an outwardly extending arm provided with split collars 22 and 23. A conveyer pipe 24, which is formed of thin metal so as to provide a rigid outwardly extending arm or outrigger, extends through said split collars, 22 and 23 and is clamped rigidly therein by suitable bolts 25. This pipe is joined at its lower end to a flexible hose 26 which is connected at its other end to one of the intakes of the suction device 6. It will be apparent from the drawing that there is a separate flexible hose 26 for each conveyer pipe 24, and these separate flexible sections of hose are each connected to a separate intake on the suction device.

The conveyer pipe or arm 24 supports at its outer end a flexible hose or pipe 27 which leads to the picking nozzle 28, see Fig. 1. The coupling for connecting the pipe 24 to the flexible hose 27 is formed so that the hose may turn freely in a vertical plane relative to the metal pipe 24. As herein shown, said coupling consists of a sleeve 29, which is split and clamped to the end of the pipe 24 by suitable bolts passing through openings 30 formed through the sleeve for drawing the parts thereof together. (See Fig. 6). This sleeve is bent laterally at its outer end and is formed with an annular flange 31, in which is cut an annular groove 32 and recesses 33, which lead through the flange thereto.

A second sleeve 34 adapted to enter the flexible hose 27 is also bent laterally so that the passage from one sleeve 34 to the other sleeve 29 is not in any way obstructed. This sleeve 34 is provided with oppositely disposed projecting lugs 35, which are adapted to enter the recesses 33, when brought into register therewith, so that the lug may be passed through the flange into an annular groove 32. A thumb screw 36 carried by the flange 31 may be moved into and out of the path of the lug 35, so as to prevent said lug from registering with the recess 33, and thus the two sleeves 29 and 34 will be held so that they may rotate relative to each other in parallel planes. By this construction the flexible hose 27 and the conveyer pipe 24 will be permitted to move freely in planes parallel with each other.

The flexible hose 27 is made in two sections, as herein shown, and these sections are preferably of different diameters, the section nearest the conveyer pipe 24 being, of course, of larger diameter than the section connected to the nozzle. The two sections are joined together by a coupling 37, which is shown in detail in Fig. 4. This coupling consists of a sleeve or collar 38, which is attached to the smaller section of flexible hose, and is formed with a V-shaped groove 39 adjacent its outer end. Said sleeve or collar 38 is preferably made of hardened steel and may be suitably attached to an inner sleeve 40, which extends within the smaller section of hose and is secured thereto by the usual clamping collar 41.

A second sleeve 42 is inserted within the upper or larger section of hose, and is clamped therein by the usual clamping collar 43. This upper sleeve 42 is also made of hardened steel and has an inner end beveled inwardly, as at 44. The outer face of the sleeve 42 is threaded, as at 45, so as to receive a collar 46, which is also made of hardened steel, and is provided with a beveled shoulder 47. When the collar 46 is threaded on to the sleeve 42, the beveled shoulders 44 and 47 form a V-shaped groove. This V-shaped groove, together with the V-shaped groove 39 in the sleeve 38 form a raceway for a series of balls 48. It will be apparent that when the parts are assembled, said balls will serve to hold the two parts together, and yet permit one to rotate axially relative to the other. The collar 46 is recessed at its lower face, and within said recess is placed a suitable packing ring 49, which is held therein by a washer 50 and suitable screws 51. This packing ring serves to make an air tight joint. It should also be noted that a packing ring 52ª is provided for the coupling, which joins the flexible hose 27 to the conveyer pipe 24, so that the joint in said coupling is also air tight.

The mechanical picking fingers are driven by a flexible shaft 52, (see Figs. 1, 2 and 5). This flexible shaft is connected to the nozzle at its lower end, while the upper end of the flexible shaft is connected to a driving wheel 53, supported by a bracket arm 54 mounted on the coupling between the flexible hose 27 and the conveyer pipe 24.

As shown in the drawings, the flange 31 of the sleeve 29 is extended and bent laterally so as to form the bracket 54.

The bracket 54 has a projecting bearing 55, in which a short shaft connected with the driving wheel 53 rotates. The flexible shaft extends beyond its protecting covering and is coupled in the usual way with said short shaft.

A thumb screw 56 carried by the bearing 55 may engage a groove 57 in a collar carried by the upper end of a casing for the flexible shaft, and hold the parts assembled.

The driving wheel 53 of the flexible shaft is operated, as herein shown, by a belt connection with a driving pulley 58 mounted loosely on the fixed shaft or support 15, and held from lateral movement by the collar 19 of the supporting bracket 18, and by the sleeve 21 secured to the shaft or support 15. This driving pulley 58 receives its movement through a belt connection with the main driving shaft 59. This main driving shaft 59 is mounted in suitable bearings 60 on the main frame 1, and is operated by a belt 62, which runs over a belt wheel 63 on the main shaft of the engine. Said belt 62 also runs over idlers 64 so that the direction of the movement may be changed. While I have shown and described a belt connection for driving the main shaft, and also a belt connection for driving the pulleys which operate the flexible shaft, it will, of course, be understood that any other sort of driving connection may be utilized, and that the belts herein referred to are purely for the purpose of illustration.

As has already been noted, the metal conveyer pipe 24 is mounted on a bracket which turns freely on the fixed shaft or support 15. Each bracket carrying a conveyer pipe is provided with an arm 65, which is bolted to the collars 22 and 23, and said arm projects downwardly below the fulcrum or pivot point of the bracket 18. A weight 66 is adjustably secured to said arm. This weight is for the purpose of counter-balancing the weight of the conveyer pipe 24, the coupling at the upper end thereof, the flexible hose 27, and the parts which operate the mechanical picking fingers. The bracket 18 is also provided with an upwardly projecting arm 67, which is likewise secured to the collars 22 and 23.

A spring 68 is attached at one end to the arm 67, and at its other end to the main frame. This spring normally tends to lift the outer end of the conveyer pipe 24 and the parts supported thereby. A suitable stop chain 24ª may be provided for limiting the upward swing of this pipe 24.

From the above description it will be apparent that I have provided a cotton picker wherein a plurality of picking nozzles are independently connected with the suction device, and wherein the flexible hose and the flexible shaft for driving the mechancal fingers are supported by an outwardly projecting conveyer pipe, which is so proportioned and arranged as to permit a wide range of movement of the nozzle from one part of the cotton plant to another, or along the row of cotton plants, and at the same time the weight of the flexible hose and the flexible shaft, also the weight of the supporting conveyer pipe is so counterbalanced and operated by the spring attached thereto that said conveyer pipe and flexible hose will readily follow the movements of the picker without any undue exertion of his part. Furthermore, the coupling between the sections of flexible hose readily permits the nozzle to be turned about its longitudinal axis for presenting the picking mouth of the nozzle at different angles to the cotton bolls.

The operation of the device will be apparent from the above description. The nozzle is moved about the cotton plant by the picker, and the cotton removed therefrom by the mechanical picking fingers. The cotton will be conveyed from the nozzle through the flexible hose 27 and the conveyer pipe 24, and the flexible hose connecting the conveyer pipe 24 to the suction device and forced by the suction device through the receiving pipe 7 to either one or the other of the cross pipes 8, depending upon the position of the valves 9 and 10. It will be apparent that the pickers operating the different nozzles may move along the row of cotton plants within a comparatively long range without requiring a shifting of the position of the entire vehicle, and for all positions along the row the weight of the conveying parts for the cotton and the operating parts for the mechanical pickers are practically all removed from the picker.

The means for distributing the cotton fiber in the hampers is shown in detail in Figs. 9 to 11. On each end of the cross pipe 8 is a distributer which is formed with an open delivering end 69, a closed bottom 70, and side walls 71. The side walls 71 are preferably tapered from the inner end to the outer end thereof. The bottom portion 70 is also preferably wider than the diameter of the cross pipe 8.

A bar 72 is secured to the side walls 71, and projects over the same, as shown in Fig. 11; a second bar 73 is secured to the distributer adjacent its delivering end 69.

Mounted on the bars 72 and 73 are a plurality of rods 74 which are secured thereto by suitable screws. These rods are spaced from each other, and the spaces between the rods slightly increase from the receiving end of the distributer end toward the delivery end thereof. The rods are also rectangular in cross section and arranged so that the adjacent walls are parallel. The extreme outer ends of the rods are curved downwardly slightly, as at 75. The cross bar 73 between the rods is cut away on its inner face, so as to form an inclined wall 76.

In the operation of my device the cotton is thrown by the force of the suction device 6 through the pipe 8 into a distributer. As the cotton leaves the pipe 8, it will strike the bars 74, and following along the bars, will be directed by the curved ends 75 thereof downwardly into the hampers. By making the rods square the space between the rods is shaped so that the cotton will not wedge therebetween. Furthermore, by tapering this space outwardly, the cotton, as it moves along the rods, will not be caused to wedge between the rods. Then again, by cutting away the inner face of the cross supporting bar 73, as at 76, I avoid any shoulder which would tend to stop the movement of the cotton. By this improved distributer, the cotton is carried along the rods and directed into a hamper without any wedging of the cotton, which would tend to stop the delivery of the cotton fiber into the hamper. Furthermore, the sand and other small heavy particles will be thrown between the bars 74 and over the edge of the hamper, so that my distributer not only carries the cotton and directs it to the hamper, but separates the heavy particles of dust therefrom.

The brackets 2, 2, which support the wheels are preferably secured to the main frame 1, so that said brackets may be adjusted laterally of the frame, and thereby the wheels 3, 3, spaced so as to pass between alternate rows of different widths, or so as to include between the wheels more than two rows if desired.

It is obvious that minor changes in the details of construction and the arrangement of parts may be made without departing from the spirit of the invention, as set forth in the appended claims.

Having thus described my invention, what I claim is:—

1. A cotton picker including in combination a flexible suction conveyer pipe, a picker nozzle connected to the outer end of said pipe, an inflexible suction pipe, means for connecting said flexible pipe to said inflexible pipe, whereby said flexible pipe is free to turn about said connection in a vertical plane, means for pivotally supporting said inflexible pipe, whereby the same is free to move in a vertical plane, and means connected to said inflexible pipe for counter-balancing the weight of the flexible pipe supported thereby.

2. A cotton picker including in combination a flexible suction conveyer pipe, a picker nozzle connected to the outer end of said pipe, an inflexible suction conveyer pipe, means for connecting said flexible pipe to said inflexible pipe, whereby said flexible pipe is free to turn about said connection in a vertical plane, means for pivotally supporting said inflexible pipe, whereby the same is free to move in a vertical plane, a flexible shaft for operating the picker nozzle, and means carried by said connection between the pipes for supporting said flexible shaft, and means connected to said inflexible pipe for counter-balancing the weight of the flexible pipe and the flexible shaft supported thereby.

3. A cotton picker including in combination a movable support, a plurality of flexible suction conveyer pipes, a picker nozzle connected at the outer end of each pipe, an inflexible suction conveyer pipe for each flexible pipe, means for connecting each flexible pipe to the inflexible pipe, whereby said flexible pipe is free to turn about said connection in a vertical plane, means for supporting said inflexible pipes whereby each of said pipes may move independently of the others in a vertical plane, and means connected to each inflexible pipe for counter-balancing the weight of the flexible pipe supported thereby.

4. A cotton picker including in combination a movable support, a plurality of flexible suction conveyer pipes, a picker nozzle connected to the outer end of each pipe, an inflexible suction conveyer pipe for each flexible pipe, means for connecting each flexible pipe to the inflexible pipe, whereby said flexible pipe is free to turn about said connection in a vertical plane, a flexible shaft for operating each picker nozzle, means for supporting said shaft from said connection between the flexible and inflexible pipes, and means connected to each inflexible pipe for counter-balancing the weight of the flexible pipe and flexible shaft supported thereby.

5. A cotton picker including in combination a movable support, a plurality of inflexible suction pipes pivotally mounted on said support and projecting outwardly therefrom in substantially the same direction, each of said inflexible pipes having a flexible connection with a common suction device, a flexible suction pipe connected to the outer end of each inflexible pipe and supported thereby, a picker nozzle mounted on each flexible suction pipe, a weight connected to the inner end of each inflexible pipe, whereby said inflexible pipe is moved about its pivotal support for counter-balancing the outwardly projecting parts thereof, and the flexible pipe supported thereby.

6. A cotton picker including in combination a movable support, a plurality of inflexible suction pipes pivotally mounted on said support, and projecting outwardly therefrom in substantially the same direction, flexible means for connecting each inflexible pipe with a common suction device, a flexible pipe connected with the outer end of each inflexible pipe and supported thereby, a picker nozzle carried by each flexible suction pipe, a flexible shaft for operating said nozzle, said flexible shaft being supported by the outer end of the inflexible supporting pipe, means for operating said flexible shaft, a weight attached to the inner end of each inflexible pipe, and a spring attached to each inflexible pipe and coöperating with said weight to turn said inflexible pipe about its pivotal support, to counter-balance the outwardly projecting parts thereof and the flexible pipe, and the flexible shaft supported thereby.

7. A cotton picker including in combination a movable support, an inflexible suction pipe pivotally supported thereby so as to swing in a vertical plane, said pipe being so disposed as to project outwardly, longitudinally from said support, a flexible suction pipe, a picker nozzle carried by said flexible pipe, a coupling for connecting said flexible pipe to the outer end of said inflexible pipe, whereby said flexible pipe may swing relative to the inflexible pipe so as to maintain substantially a vertical position, and means connected to said inflexible pipe for moving the same about its pivot to counter-balance the outwardly projecting parts of the inflexible pipe and the flexible pipe supported thereby.

8. A cotton picker including in combination a movable support, an inflexible suction pipe pivotally supported thereby so as to swing in a vertical plane, said pipe being so disposed as to project outwardly, longitudinally from said support, a flexible suction pipe, a picker nozzle carried by said flexible pipe, a coupling for connecting said flexible pipe to the outer end of said inflexible pipe, whereby said flexible pipe may swing relative to the inflexible pipe so as to maintain substantially a vertical position, and means connected to said inflexible pipe for moving the same about its pivot to counter-balance the outwardly projecting parts of the inflexible pipe and the flexible pipe supported thereby, said last named means including a weight attached to the inner end of said inflexible pipe.

9. A cotton picker including in combination a support, a plurality of inflexible suction pipes, each of which is pivoted intermediate its ends to said support, a flexible pipe for connecting each inflexible pipe to a common suction device, a flexible suction pipe for each inflexible pipe, a picker nozzle mounted on each last named flexible suction pipe, a coupling for connecting the flexible suction pipe for the nozzle to the outer end of the inflexible pipe, said coupling permitting the flexible suction pipe to maintain substantially a vertical position, a weight attached to the inner end of each inflexible pipe, and a spring attached to each inflexible pipe and coöperating with said weight for counter-balancing the weight of the inflexible pipe projecting beyond its pivot, and the flexible suction pipe supported thereby.

10. A cotton picker including in combination a support, a plurality of inflexible suction pipes, each of which is pivoted intermediate its ends to said support, a flexible pipe for connecting each inflexible pipe to a common suction device, a flexible suction pipe for each inflexible pipe, a picker nozzle mounted on each last named flexible suction pipes, a coupling for connecting the flexible suction pipe for the nozzle to the outer end of the inflexible pipe, said coupling permitting the flexible suction pipe to maintain substantially a vertical position, a weight attached to the inner end of each inflexible pipe, and a spring attached to each inflexible pipe and coöperating with said weight for counter-balancing the weight of the inflexible pipe projecting beyond its pivot, and the flexible suction pipe supported thereby, said weights being adjustably attached to the pipes on which they are carried, whereby the counter-balancing force may be varied.

11. A cotton picker including in combination a movable support, an inflexible suction pipe, pivoted between its ends to said support so as to project outwardly and upwardly therefrom, means for connecting the inner end of said suction pipe to a suction device, whereby said pipe is free to move about its support, a flexible suction pipe, a picker nozzle carried thereby, a coupling for connecting said flexible suction pipe to the outer end of said inflexible pipe, whereby said flexible suction pipe is supported so that it may be maintained in substantially a vertical position, a bracket carried by the outer end of said inflexible pipe, a flexible shaft journaled in said bracket for operating said picker nozzle, means connected to the inner end of said inflexible pipe for swinging the same about its pivot to counter-balance the parts thereof projecting beyond the pivotal support, and the flexible suction pipe and flexible shaft connected to and supported by the outer end of said inflexible pipe.

12. A cotton harvester including in combination a storage receptacle, a suction operated device for picking and delivering the cotton to said receptacle, and a distributer for distributing the cotton in the storage receptacle, said distributer having a bottom and side walls, and a plurality of spaced rods forming the top of the distributer, said rods extending lengthwise of the distributer and projecting beyond the end thereof, the space between the rods increasing toward the outer ends thereof, the outer ends of said rods being bent downwardly for deflecting the cotton into the receptacle.

13. A cotton harvester including in combination a storage receptacle, a suction operated device for picking and delivering the cotton to said receptacle, and a distributer for distributing the cotton in the storage receptacle, said distributer having a bottom and side walls, and a plurality of spaced rods being substantially straight and forming the top of the distributer, said rods extending lengthwise of the distributer and projecting beyond the end thereof, the outer ends of said rods being bent downwardly for deflecting the cotton into the receptacle, said rods toward the free ends thereof being inclined downwardly, whereby the air conveying the cotton into the distributer will pass between the rods.

14. A cotton harvester device including in combination a storage receptacle, a suction operated device for picking and delivering the cotton to said receptacle, and a distributer having a substantially closed bottom and side walls, rods forming the top of said distributer, said rods being rectangular in cross section with their inner faces in the same line, the space between the rods increasing toward the outer ends thereof, the outer ends of said rods projecting beyond the distributer and being bent downwardly for deflecting the cotton into the storage receptacle.

15. A cotton harvester device including in combination a storage receptacle, a suction operated device for picking and delivering the cotton to said receptacle, and a distributer having a substantially closed bottom and side walls, rods forming the top of said receptacle, said rods being rectangular in cross section with their inner faces in the same line, the space between the rods increasing toward the outer ends thereof, the outer ends of said rods projecting beyond the distributer and being bent downwardly for deflecting the cotton into the storage receptacle, said rods along the top of the distributer being inclined downwardly, whereby the air conveying the cotton to the distributer will pass between the rods.

In testimony whereof, I affix my signature, in the presence of two witnesses.

THEODORE E. STRAUS.

Witnesses:
  E. G. MASON,
  GRACE P. BRERETON.